(12) United States Patent
Vulcan

(10) Patent No.: US 11,248,691 B2
(45) Date of Patent: Feb. 15, 2022

(54) APPARATUS FOR GENERATING IMPULSE-DYNAMIC PROCESS FORCES

(71) Applicant: Hatebur Umformmaschinen AG, Reinach (CH)

(72) Inventor: Mihai Vulcan, Hofstetten (CH)

(73) Assignee: Hatebur Umformmaschinen AG, Reinach (CH)

(*) Notice: Subject to any disclaimer, the term of this patent is extended or adjusted under 35 U.S.C. 154(b) by 759 days.

(21) Appl. No.: 15/752,029

(22) PCT Filed: Aug. 9, 2016

(86) PCT No.: PCT/EP2016/068928
§ 371 (c)(1),
(2) Date: Feb. 12, 2018

(87) PCT Pub. No.: WO2017/025527
PCT Pub. Date: Feb. 16, 2017

(65) Prior Publication Data
US 2018/0238428 A1    Aug. 23, 2018

(30) Foreign Application Priority Data
Aug. 13, 2015 (CH) .................... 01159/15

(51) Int. Cl.
*F16H 43/00* (2006.01)
*F16H 43/02* (2006.01)
(Continued)

(52) U.S. Cl.
CPC ............. *F16H 43/02* (2013.01); *B23D 15/04* (2013.01); *B23D 15/14* (2013.01); *B25D 9/12* (2013.01);
(Continued)

(58) Field of Classification Search
CPC ... B25D 9/12; B25D 9/16; B25D 9/18; B25D 9/26; F16H 43/02
See application file for complete search history.

(56) References Cited

U.S. PATENT DOCUMENTS 2,106,160 A * 1/1938 Baker .................. B21K 5/06
                                                              76/5.6
3,395,536 A    8/1968 Foster
(Continued)

FOREIGN PATENT DOCUMENTS

CN       1181033 A     5/1998
CN     101927479 A    12/2010
(Continued)

*Primary Examiner* — Eyamindae C Jallow
(74) *Attorney, Agent, or Firm* — The Webb Law Firm

(57) ABSTRACT

An apparatus for generating impulse-dynamic process forces includes a pressure chamber, a connecting chamber and a bolt chamber. The pressure chamber includes a plunger arranged to be pushed into the pressure chamber for compression of a hydraulic medium located therein. In the connecting chamber there is displaceably arranged a stepped piston which has a valve body for closing an orifice connecting the pressure chamber to the connecting chamber. In the bolt chamber there is located a displaceable impact bolt which has a first bolt portion and a second bolt portion. The first bolt portion seals an interior space of the bolt chamber that surrounds the second bolt portion. Connected to the bolt chamber there is at least one pressure reservoir containing pressurised pressure medium, which pressure reservoir is in communicating connection via a connection port with the interior space of the bolt chamber.

21 Claims, 9 Drawing Sheets

(51) Int. Cl.
  *B23D 15/04*   (2006.01)
  *B23D 15/14*   (2006.01)
  *B25D 11/10*   (2006.01)
  *B25D 9/12*    (2006.01)
  *B25D 9/14*    (2006.01)
  *F16H 39/42*   (2006.01)
  *B25D 9/26*    (2006.01)

(52) U.S. Cl.
  CPC ............... *B25D 9/145* (2013.01); *B25D 9/26* (2013.01); *B25D 11/10* (2013.01); *F16H 39/42* (2013.01)

(56) References Cited

U.S. PATENT DOCUMENTS

| | | | |
|---|---|---|---|
| 3,792,738 A * | 2/1974 | Mori | B25D 9/12 |
| | | | 173/202 |
| 3,908,767 A * | 9/1975 | Klemm | B06B 1/183 |
| | | | 173/78 |
| 4,142,447 A * | 3/1979 | Krasnoff | B25D 9/12 |
| | | | 91/280 |
| 4,281,587 A * | 8/1981 | Garcia-Crespo | B25D 9/12 |
| | | | 91/290 |
| 4,342,255 A | 8/1982 | Watanabe et al. | |
| 4,413,687 A * | 11/1983 | Eklof | B25D 9/26 |
| | | | 173/207 |
| 4,450,920 A * | 5/1984 | Krasnoff | B25D 9/12 |
| | | | 173/80 |
| 4,460,051 A | 7/1984 | Widmer | |
| 4,659,294 A * | 4/1987 | Barthomeuf | F01L 25/066 |
| | | | 417/397 |
| 4,745,981 A * | 5/1988 | Buske | B25D 9/145 |
| | | | 173/202 |
| 4,895,492 A * | 1/1990 | Bittel | F04B 9/105 |
| | | | 417/225 |
| 5,117,921 A * | 6/1992 | Bartels | B25D 9/145 |
| | | | 173/105 |
| 5,884,713 A | 3/1999 | Shinohara et al. | |
| 7,410,010 B2 | 8/2008 | Henriksson et al. | |
| 8,069,928 B2 * | 12/2011 | Birath | B25D 9/16 |
| | | | 173/1 |
| 8,704,507 B2 | 4/2014 | Oksman et al. | |
| 8,704,547 B2 | 4/2014 | Oksman et al. | |
| 2012/0160528 A1 * | 6/2012 | Theobalds | B25D 9/16 |
| | | | 173/1 |
| 2015/0336256 A1 * | 11/2015 | Moore | B25D 9/12 |
| | | | 173/1 |
| 2017/0080555 A1 * | 3/2017 | Moore | B25D 9/22 |

FOREIGN PATENT DOCUMENTS

| | | |
|---|---|---|
| CN | 102667008 A | 9/2012 |
| DE | 2107510 | 9/1971 |
| FR | 2091649 | 1/1972 |
| FR | 2139398 A5 | 1/1973 |
| FR | 2421035 A1 | 10/1979 |
| GB | 128589 A | 6/1919 |
| GB | 1307188 | 2/1973 |
| GB | 1340017 | 12/1973 |
| JP | S461590 A | 9/1971 |
| JP | S531602 | 1/1978 |
| JP | S565089 U | 1/1981 |
| JP | S56500207 A | 2/1981 |
| JP | S581690 U | 1/1983 |
| JP | S59150896 A | 8/1984 |
| JP | S61204496 A | 9/1986 |
| JP | H571290 A | 3/1993 |
| JP | H7506058 A | 7/1995 |
| JP | H10169358 A | 6/1998 |
| JP | 2001334478 A | 12/2001 |
| WO | 2006022584 A1 | 3/2006 |
| WO | 2011077001 A1 | 6/2011 |

* cited by examiner

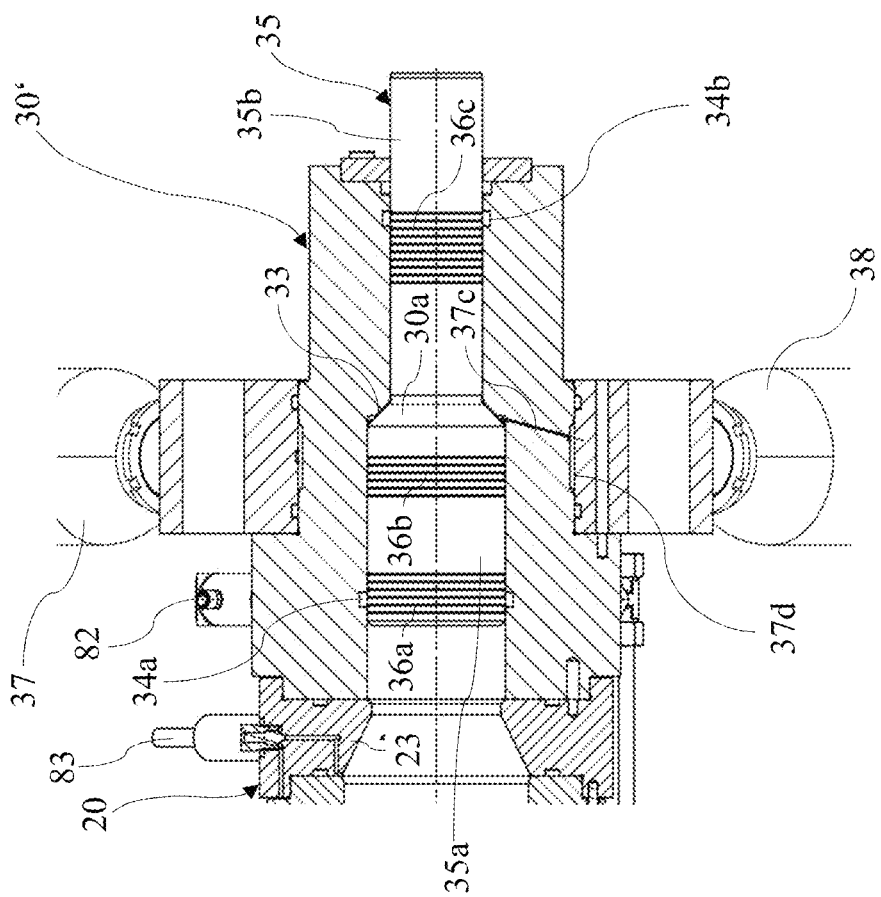
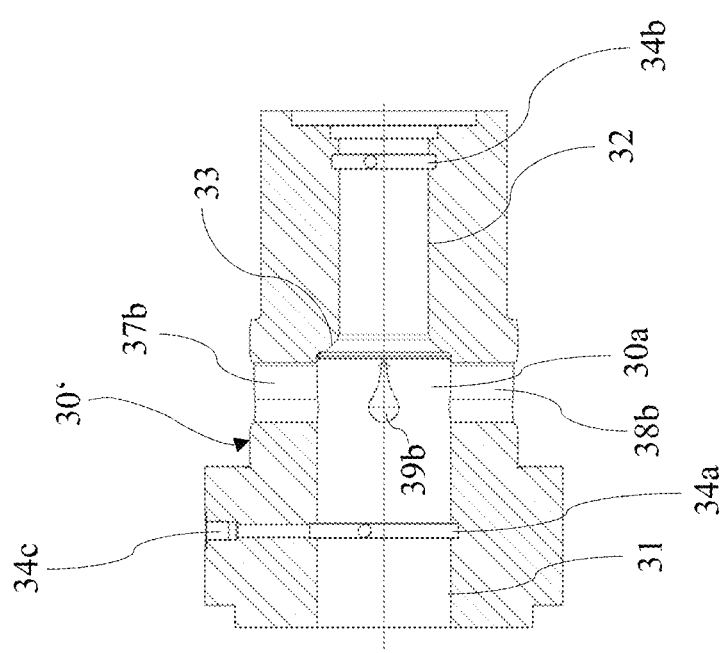
Fig. 9
Fig. 8

APPARATUS FOR GENERATING IMPULSE-DYNAMIC PROCESS FORCES

CROSS-REFERENCE TO RELATED APPLICATIONS

This application is the United States national phase of International Application No. PCT/EP2016/068928 filed Aug. 9, 2016, and claims priority to Switzerland Patent Application No. 01159/15 filed Aug. 13, 2015, the disclosures of which are hereby incorporated in their entirety by reference.

BACKGROUND OF THE INVENTION

Field of the Invention

The present invention relates to an apparatus for generating impulse-dynamic process forces and to a use of such an apparatus.

Description of Related Art

Impulse-dynamic process forces are to be understood as being forces having an impact-like effect, such as are required, for example, for shearing off workpieces from a rod material in forming machines or in the compaction of material in powder metallurgy.

Forming, according to DIN 8580, is the specific modification of the shape, the surface and/or the material properties of a body while retaining its mass and material coherence. If, as a result of the forming, the material reaches the limit of its capacity to change shape, then, depending upon the method used, this results, for example, in separation of the material (for example shearing off from a rod material) or in compaction of the material (for example compaction in powder metallurgy). For the forming, a material requires an energy supply, which is usually provided by dedicated machines. The temperature of the material rises during the forming operation and gives off the heat to its surroundings (tools, air etc.).

It is known from literature and from practice that, during a shearing operation, an adiabatic shear failure occurs if the reduction in strength caused by the increase in temperature is greater than the increase in strength due to the strain hardening and strain rate hardening. As a result of the increased speed of the shearing blade, an increase in temperature occurs in the immediate vicinity of the shearing edge, the gradient of which temperature increase is greater than the gradient of the dissipation of heat into the adjacent zones as a result of the thermal conductivity of the material used. What is known as a "shear band" develops, the propagation speed of which in the shearing direction is a multiple (order of magnitude 10-40× for steel) of the blade speed. A prerequisite for the development of the shear band is a constant or increasing speed of the separating tool (blade). In order that the speed condition can be fulfilled, the separating or shearing process must be supplied with energy that is a multiple higher than that actually needed for the shearing operation.

GB 128589 A describes an apparatus with which a hydraulic impulse can be generated and transmitted in the form of a shock wave via a line to a remote receiver arrangement which converts the impulse to switch over, for example, a signalling device for rail traffic. The apparatus has a first chamber and a second chamber connected thereto via a closable restriction and also a line which is connected to the second chamber and at the end of which the receiver arrangement is located. The two chambers and the line are filled with a fluid hydraulic medium. A plunger is arranged to be introduced into the first chamber, with which plunger the hydraulic medium can be compressed so that the pressure in the medium increases. In the second chamber there is located a displaceable piston having a valve body which closes the restriction in the rest position of the apparatus. If the plunger, triggered by an external force, is temporarily introduced into the first chamber, the pressure therein increases until the piston in the second chamber moves and the valve body moves away from the restriction. In that way the increased pressure in the first chamber is able to act upon the piston, with the result that in the second chamber a pressure impulse is generated which propagates at the speed of sound through the second chamber and the line to the receiver arrangement where it acts upon a spring-loaded actuator piston, with the result that the latter is briefly displaced. Once the pressure impulse has subsided, the actuator piston is reset again by spring force. The piston in the second chamber returns to its starting position and closes the restriction. At the same time the plunger is pushed out of the first chamber again.

The apparatus known from GB 128589 A can in principle generate only relatively weak impulses containing little energy, because the transmission line connecting the generator to the receiver, which line is very long in comparison with its diameter, has a strongly resilient effect and considerably reduces the force impulse. That apparatus is therefore not suitable for providing very strong impulse-dynamic forces having a high energy content, such as are required for applications in separating or compacting processes. In addition, using this known apparatus it is not possible to generate a substantial volumetric flow rate which would be able to bring about, on the receiver arrangement side, a stroke of the actuator piston necessary for such applications, with, at the same time, high thrust force or high impact pressure.

A problem underlying the present invention is therefore that of providing an apparatus for generating impulse-dynamic process forces which, by means of a comparatively low drive power, is able to store a large amount of energy and deliver that energy within a very short time, so that (briefly) high process forces having at the same time a high energy content are available.

SUMMARY OF THE INVENTION

That problem is solved by the apparatus according to the invention.

An apparatus according to the invention for generating impulse-dynamic process forces comprises:
  a pressure chamber in which pressurised hydraulic medium is arranged;
  means for temporarily increasing the pressure of the hydraulic medium located in the pressure chamber;
  a connecting chamber arranged downstream of the pressure chamber and connected thereto;
  a bolt chamber arranged downstream of the connecting chamber and connected thereto;
  a stepped piston arranged so as to be displaceable in the connecting chamber, which piston has a valve body for closing an orifice connecting the pressure chamber to the connecting chamber, and a piston portion facing the bolt chamber, by means of which piston portion a transmission space of the connecting chamber between the piston portion and the bolt chamber is sealed with respect to the side of the connecting chamber remote from the bolt chamber, the transmission space having pressurised hydraulic medium arranged therein; and an impact bolt arranged so as to be displaceable in the bolt chamber.

The impact bolt has a first bolt portion with a larger cross-section and a second bolt portion with a smaller cross-section, the first bolt portion sealing an interior space of the bolt chamber that surrounds the second bolt portion with respect to the connecting chamber. Connected to the bolt chamber there is at least one pressure reservoir containing pressurised pressure medium, which pressure reservoir is in communicating connection via a connection port with the interior space of the bolt chamber.

The construction of the impact bolt in such a way that an interior space of the bolt chamber is sealed with respect to the connecting chamber, and the communicating connection of that interior space with at least one pressure reservoir containing pressurised pressure medium on the one hand enable the impact bolt to be acted upon, from the direction of the connecting chamber, with impulses having a high energy content and, on the other hand, enable the impact bolt to be reliably returned to its starting position by the pressure medium. The apparatus not only generates a rapid impulse, but also generates a sufficient volumetric flow rate and a sufficient stroke of the impact bolt having great force and a high energy content.

Preferably the bolt chamber is arranged immediately downstream of the connecting chamber. By the arrangement of the bolt chamber immediately after the connecting chamber, a very short impulse guideway is achieved at the same time as a high impact pressure.

The apparatus advantageously has two or more pressure reservoirs with associated connection ports which are arranged diametrically opposite or at equal distances apart in the bolt chamber. This prevents the development of flow-induced transverse forces during the outward travel of the impact bolt, which forces can move the impact bolt off-axis and therefore give rise to rapid wear.

Advantageously the impact bolt is arranged to travel out as far as an end position in the bolt chamber and the apparatus has an end position damping arrangement which brakes the impact bolt before it reaches its end position. It is thus ensured that the residual energy of the impact bolt is captured and the impact bolt reaches its end position at a reduced speed, thus preventing a hard impact of the impact bolt on any mechanical stop which may be present.

In accordance with an especially advantageous arrangement, the at least one connection port for the pressure reservoir is arranged in the bolt chamber so that, during the outward travel of the impact bolt, it is increasingly closed by the first bolt portion and the resulting back pressure brakes the impact bolt until it comes to a complete standstill. The end position damping of the impact bolt can thus be realised in a simple way.

Preferably the end position of the impact bolt is defined by a stop. As a result, the impact bolt can be prevented from overshooting on the tool side.

Advantageously the opening cross-section of the at least one connection port is tapered in a direction away from the stepped piston, towards the stop. This benefits the build-up of the back pressure that brakes the impact bolt.

Advantageously the impact bolt is returnable to a starting position by means of the at least one pressure reservoir. This is effected by an inflow of pressure medium into the interior space of the bolt chamber, with the result that the impact bolt is pushed in the direction of the connecting chamber. The return of the impact bolt to its starting position can thus be realised in a simple way.

The means for temporarily increasing the pressure of the hydraulic medium located in the pressure chamber can comprise, for example, a high-pressure reservoir which delivers pressure impulses to the pressure chamber via a valve.

Advantageously the means are realised by a plunger which is arranged to be pushed into the pressure chamber for compression of the hydraulic medium located in the pressure chamber, the apparatus advantageously comprising a plunger drive for pushing the plunger into the pressure chamber. The plunger drive generates, with relatively low power, a large amount of energy which is then delivered to the impact bolt in an extremely short time.

Advantageously the apparatus has means for maintaining the fill pressure in the pressure chamber, in the transmission space and in the interior space of the bolt chamber. The means for maintaining the fill pressure allow leakage losses to be replaced during operation of the apparatus.

The apparatus advantageously has lines via which hydraulic medium or pressure medium that is displaced or escapes through sealing gaps on displacement of the stepped piston and the impact bolt can be supplied to a collecting tank. In this way it is ensured that escaped or displaced hydraulic medium or pressure medium is discharged in a controlled way.

The apparatus according to the invention is especially suitable for use for driving a tool in a forming device, a separating device or a compacting device. In particular, the tool can be a shearing tool for shearing off a workpiece from a rod material or an impact hammer for compacting or breaking up a material.

BRIEF DESCRIPTION OF THE DRAWINGS

The apparatus according to the invention is described in greater detail below on the basis of exemplary embodiments and referring to the accompanying drawings, wherein:

FIG. 8 shows an axial section through a slightly modified bolt chamber without the impact bolt;

FIG. 9 shows a further axial section through the bolt chamber with some details.

DESCRIPTION OF THE INVENTION

The following observations apply in respect of the description which follows: where, for the purpose of clarity of the drawings, reference signs are included in a Figure but are not mentioned in the directly associated part of the description, reference should be made to the explanation of those reference signs in the preceding or subsequent parts of the description. Conversely, to avoid overcomplication of the drawings, reference signs that are less relevant for immediate understanding are not included in all Figures. In that case, reference should be made to the other Figures.

Figure 1:
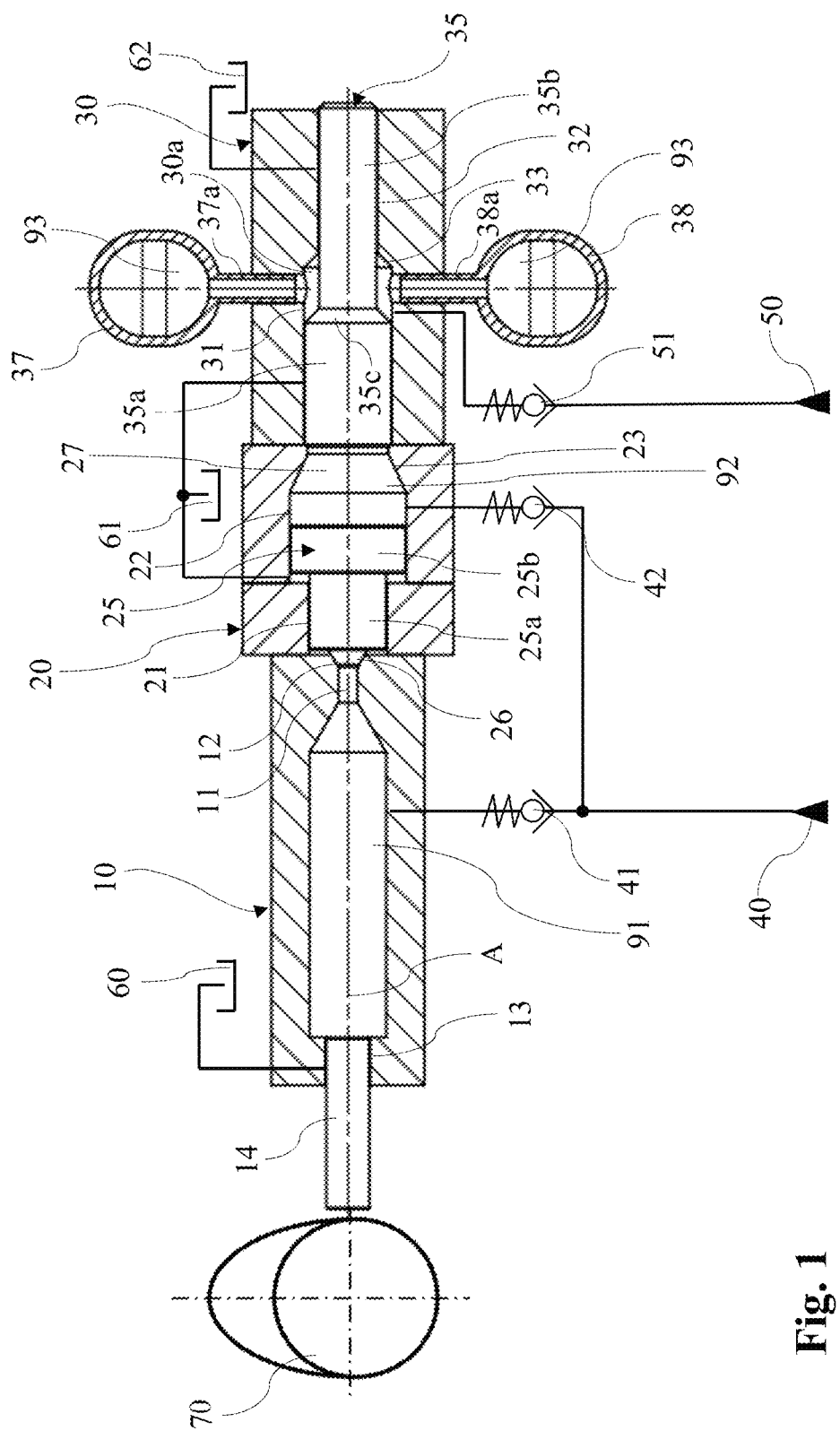
FIG. 1 shows an axial section through a first exemplary embodiment of the apparatus according to the invention.

The apparatus shown in FIG. 1 comprises three chambers arranged in alignment one after the other along a common axis A, more specifically a pressure chamber 10, a connecting chamber 20 and a bolt chamber 30.

The pressure chamber 10, which forms a hydraulic energy reservoir and in which pressurised hydraulic medium 91 is arranged, opens into the subsequent connecting chamber 20 via an axial restriction or orifice 11, the outlet opening being in the form of a conical valve seat 12. In the end wall of the pressure chamber 10 located opposite the orifice 11 there is an axial passage opening 13, through which a displacement body in the form of a cylindrical plunger 14 is arranged to be displaceable axially inwards and outwards.

The connecting chamber 20 has, in succession, two cylindrical chamber portions 21 and 22 and a conically tapering chamber portion 23, the conical chamber portion 23 opening into the adjoining bolt chamber 30 and the central, cylindrical chamber portion 22 having a somewhat larger internal diameter than the chamber portion 21 facing the pressure chamber 10. In the connecting chamber 20 there is arranged an axially displaceable stepped piston 25 having two piston portions 25a and 25b which are matched to the internal diameters of the two cylindrical chamber portions 21 and 22 of the connecting chamber 20. The piston portion 25b, which is somewhat larger in diameter or cross-section and faces the bolt chamber 30, seals a transmission space 27 of the connecting chamber 20 between the piston portion 25b and the bolt chamber 30 with respect to the side of the connecting chamber 20 that is remote from the bolt chamber 30 and faces the pressure chamber 10. In the transmission space 27 there is arranged pressurised hydraulic medium 92. The piston portion 25a, which is somewhat smaller in diameter or cross-section, has at its end face a conical valve body 26 which is of a shape complementary to the valve seat 12 of the pressure chamber 10 and, in the position shown in FIG. 1, closes the outlet opening and therefore the orifice 11 of the pressure chamber 10. It is also possible for the valve body 26 and the valve seat 12 to have different geometry. Equally, the stepped piston 25 and the connecting chamber 20 need not necessarily have circular external and internal cross-sections.

The bolt chamber 30 has a cylindrical chamber portion 31 and a cylindrical passage opening 32, the chamber portion 31 that faces the connecting chamber 20 being larger in internal diameter or cross-section than the cylindrical passage opening 32. A transition region 33 between the cylindrical chamber portion 31 and the passage opening 32 is of conical construction. An impact bolt 35 having two bolt portions 35a and 35b which are matched to the internal diameters of the cylindrical chamber portion 31 and the passage opening 32 of the bolt chamber 30 is arranged in the bolt chamber 30 so as to be axially displaceable. A transition region 35c between the first bolt portion 35a with a larger cross-section and the second bolt portion 35b with a smaller cross-section has a conical shape complementary to the transition region 33 between the cylindrical chamber portion 31 and the passage opening 32. The first bolt portion 35a with the larger cross-section seals an interior space 30a of the bolt chamber 30 that surrounds the second bolt portion 35b with respect to the connecting chamber 20. The impact bolt 35 and the bolt chamber 30 can also have external and internal cross-sections departing from the circular shape. The impact bolt 35 is movable back and forth between extreme positions shown in FIGS. 1 and 5, the bolt portion 35b with the smaller diameter or cross-section protruding (having travelled) out of the bolt chamber 30 to a greater or lesser extent depending upon the position of the impact bolt 35.

During operation of the apparatus, the pressure chamber 10 and the connecting chamber 20, or the transmission space 27, are completely filled with the (fluid) hydraulic medium 91 and 92, respectively, especially hydraulic oil. The pressure chamber 10 and the connecting chamber 20 are connected via lines (not referenced) and via respective non-return valves 41 and 42 to a first pressure source 40 (shown only symbolically) for pressurised hydraulic medium. The bolt chamber 30 or the interior space 30a thereof is likewise completely filled with a pressure medium 93, the pressure medium normally being a (fluid) hydraulic medium, especially hydraulic oil. Alternatively, the pressure medium can also be a pneumatic medium. The bolt chamber 30 or the interior space 30a thereof is connected via a line (not referenced) and a non-return valve 51 to a second pressure source 50 for the pressurised pressure medium 93. Hydraulic medium or pressure medium (leakage) escaping through the annular gaps between the plunger 14 and the passage opening 13 and between the piston portions 25a, 25b and the inner walls of the chamber portions 21, 22 of the connecting chamber 20 surrounding them and between the bolt portion 35a and the inner wall of the chamber portion 31 of the bolt chamber 30 surrounding it and between the bolt portion 35b and the passage opening 32 is discharged into collecting tanks 60, 61, 62 via lines (not referenced) and replenished from the pressure sources 40 and 50.

Two pressure reservoirs 37 and 38 are connected to the bolt chamber 30 at two diametrically opposite locations, the connecting lines 37a and 38a opening into the cylindrical chamber portion 31 close to the passage opening 32. The pressure reservoirs 37 and 38 are normally hydraulic reservoirs, but can also be in the form of compressed gas reservoirs. It is also possible for more than two pressure reservoirs to be arranged around the bolt chamber 30, preferably at equal distances apart. As will be apparent from the description of the functioning of the apparatus hereinbelow, the pressure reservoirs serve to reset the impact bolt 35.

The arrangement of the pressure reservoirs should be as uniform as possible around the circumference in order that during the outward travel of the impact bolt 35 (towards the right in the drawing) no flow-induced transverse forces develop which are able to move the impact bolt 35 off-axis and thus can give rise to rapid wear. Instead of two or more pressure reservoirs it would also be possible to provide a single pressure reservoir having two or more connecting lines to the bolt chamber 30, the two or more connection ports of which connecting lines should be distributed uniformly around the circumference of the bolt chamber 30.

The plunger 14 is assigned a plunger drive 70 which allows the plunger 14 to be driven a specific distance into the pressure chamber 10. In the exemplary embodiment illustrated, the plunger drive 70 is in the form of a cam plate which is drivable by a motor drive (not shown), for example an electric or hydraulic motor. Alternatively, it is also possible for the plunger drive to be in the form of an electric or hydraulic linear drive.

As will be apparent from the following description of details of its operation, the apparatus according to the invention allows the hydraulic storage of large amounts of energy by means of comparatively low power, that is to say a relatively long charging time, and the delivery of that stored hydraulic energy in a very short discharging time. Depending upon the drive power installed for the plunger 14, the ratio of charging time relative to discharging time is approximately from 100:1 to 1000:1.

The pressure chamber 10 completely filled with fluid hydraulic medium forms the energy reservoir. The hydraulic capacity C of the pressure chamber is calculated in accordance with the following equation:

$$C = \frac{V_0}{E}$$

where $V_0$ is the volume of the pressure chamber and E is the modulus of elasticity of the fluid medium. The potential energy of the hydraulic capacity is given generally by the following equation:

$$W = \frac{C \cdot p^2}{2}$$

where p is the pressure of the hydraulic medium in the pressure chamber.

If the volume of the hydraulic medium 91 inside the pressure chamber 10 is reduced by a specific amount dV, for example by the entry of a plunger 14, there is an increase in pressure dp which is calculated in accordance with the following equation:

$$dp = \frac{dV}{C}$$

It is known from physics that the modulus of compression K and the modulus of elasticity E (E=1/K) of a fluid medium are dependent upon the temperature and upon the pressure. Both dependencies can be both calculated in theory and determined in practice in order that appropriate measures for retaining process stability can be introduced into the design and into the operation (for example controlling the temperature of the apparatus).

The functioning and mode of operation of the apparatus according to the invention is described below with reference to FIGS. 1-6.

Both the pressure chamber 10 and the transmission space 27 of the connecting chamber 20 are completely filled with the hydraulic medium 91 and 92, respectively, and are under the same fill pressure of about 10-100 bar. Because the end faces of the stepped piston 25 are of different sizes and the circumferential faces of the piston 25 are virtually without pressure as a result of the type of sealing (annular gap seal), the stepped piston 25 will move to the left (in the drawing) as a result of the forces acting on its end faces and, via the valve body 26, will close the orifice 11 to the pressure chamber 10 interlockingly without a seal (FIG. 1).

During that movement of the stepped piston 25, at least a portion of the constrained volume of hydraulic medium between the orifice 11 and the piston portion 25a of the stepped piston 25 escapes via the annular gap seal into a line to the collecting tank 61. If the stepped piston 25 is sealed with sealing elements, a valve must be provided at this location. The fill pressure simultaneously causes the plunger 14 to travel outwards in the pressure chamber 10 until it makes contact with the cam plate of the plunger drive 70.

The interior space 30a of the bolt chamber 30 is completely filled with the pressure medium 93, the fill pressure being higher than in the transmission space 27 of the connecting chamber 20. The fill pressure set in the interior space 30a is dependent upon the set pressure of the hydraulic medium 92 and is approximately in inverse proportion to that pressure. The proportionality is determined by the ratio of the annular face 35c to the piston end face of the bolt portion 35a of the impact bolt 35. The fill pressure ensures that the impact bolt 35 with its bolt portion 35a is moved inwards to the left (in the drawing) as far as an inner stop (FIG. 1). The impact bolt 35 is likewise sealed by means of annular gap seals. As the impact bolt 35 travels inwards onto the internal stop, a portion of the constrained volume of hydraulic medium in the transmission space 27 between the bolt portion 35a and the piston portion 25b of the stepped piston 25 is discharged both via the annular gap seal of the stepped piston 25 and via the annular gap seal of the impact bolt 35 into lines to the collecting tank 61.

The pressure reservoirs 37 and 38, which are in communicating connection with the interior space 30a of the bolt chamber 30, should have as little inertia as possible and should be dimensioned so that the outward travel of the impact bolt 35 results in as small as possible a rise in pressure, that is to say they should have a characteristic curve that is as shallow as possible.

Figure 2:
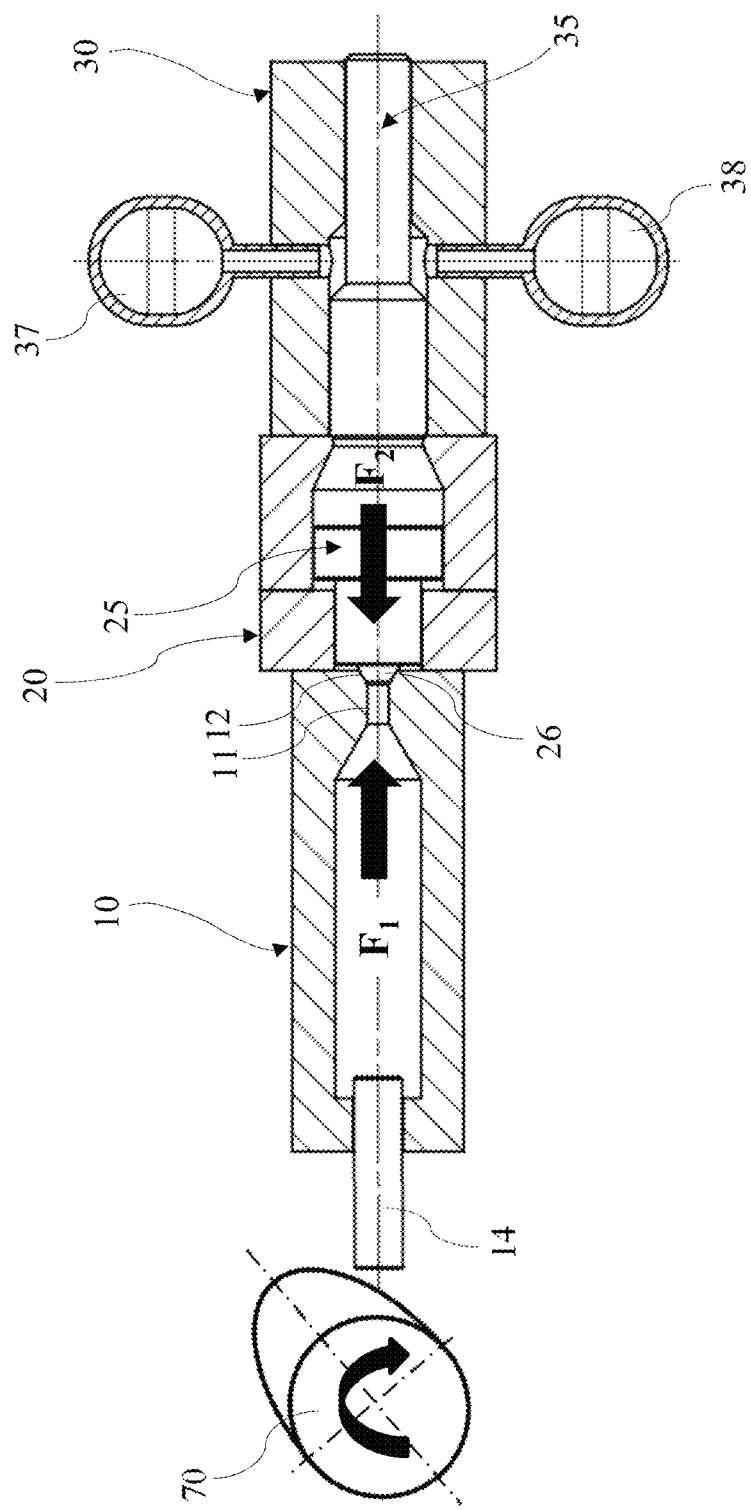
FIG. 2-6 show simplified sectional views of the apparatus according to FIG. 1 in various phases of operation.

When the cam plate of the plunger drive 70 rotates, the plunger 14 is pushed into the pressure chamber 10. The entry of the plunger 14 into the pressure chamber 10 compresses the hydraulic medium 91 contained therein, the pressure increasing almost in proportion to the travel of the plunger. The stored energy increases as a square of the increase in pressure (FIG. 2).

As long as the force F1, which is determined by the (increased) pressure in the pressure chamber 10 and which acts on the stepped piston 25, is smaller than the force F2, which is determined by the pressure in the transmission space 27 of the connecting chamber 20 and acts on the stepped piston 25 from the other side, the orifice 11 remains closed.

Figure 3:
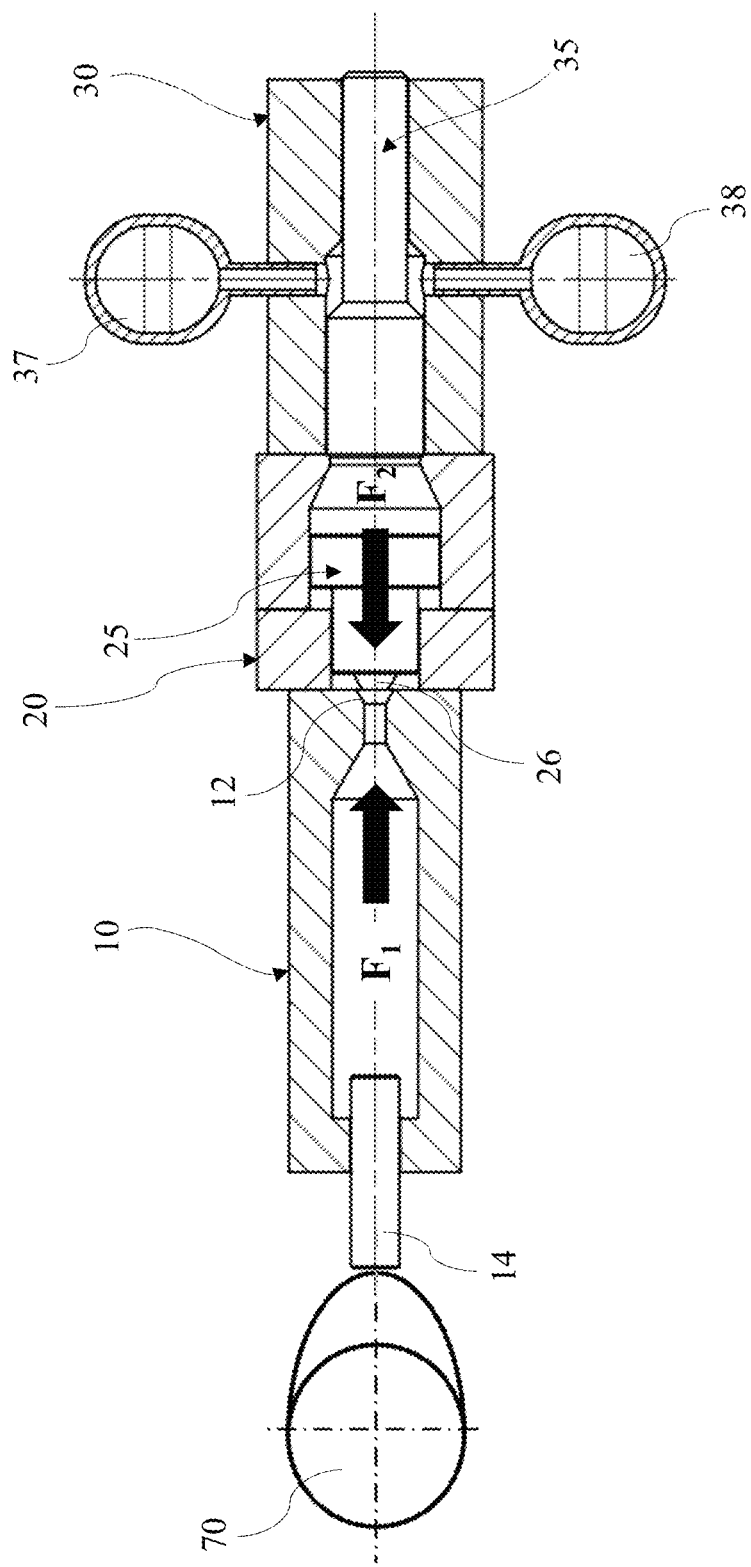

When the plunger 14 reaches a determined entry depth and thus displaces a corresponding volume of hydraulic medium, the force F1 is greater than the force F2 and the stepped piston 25 moves to the right and the orifice 11 is accordingly opened (FIG. 3).

The piston portion 25a of the stepped piston 25 with the smaller cross-section is acted upon by the high pressure from the pressure chamber 10 over a period of <0.2 ms. That sudden application of pressure with considerable force brings about an impact-like movement of the stepped piston 25 towards the right (in the drawing) which triggers a pressure surge in the transmission space 27 of the connecting chamber 20. The pressure surge crosses the transmission space 27 at the speed of sound (about 1340 m/s for hydraulic oil). As a result of the relatively short distance between the stepped piston 25 and the impact bolt 35, the shock wave reaches the impact bolt 35 with virtually no time delay.

Figure 4:
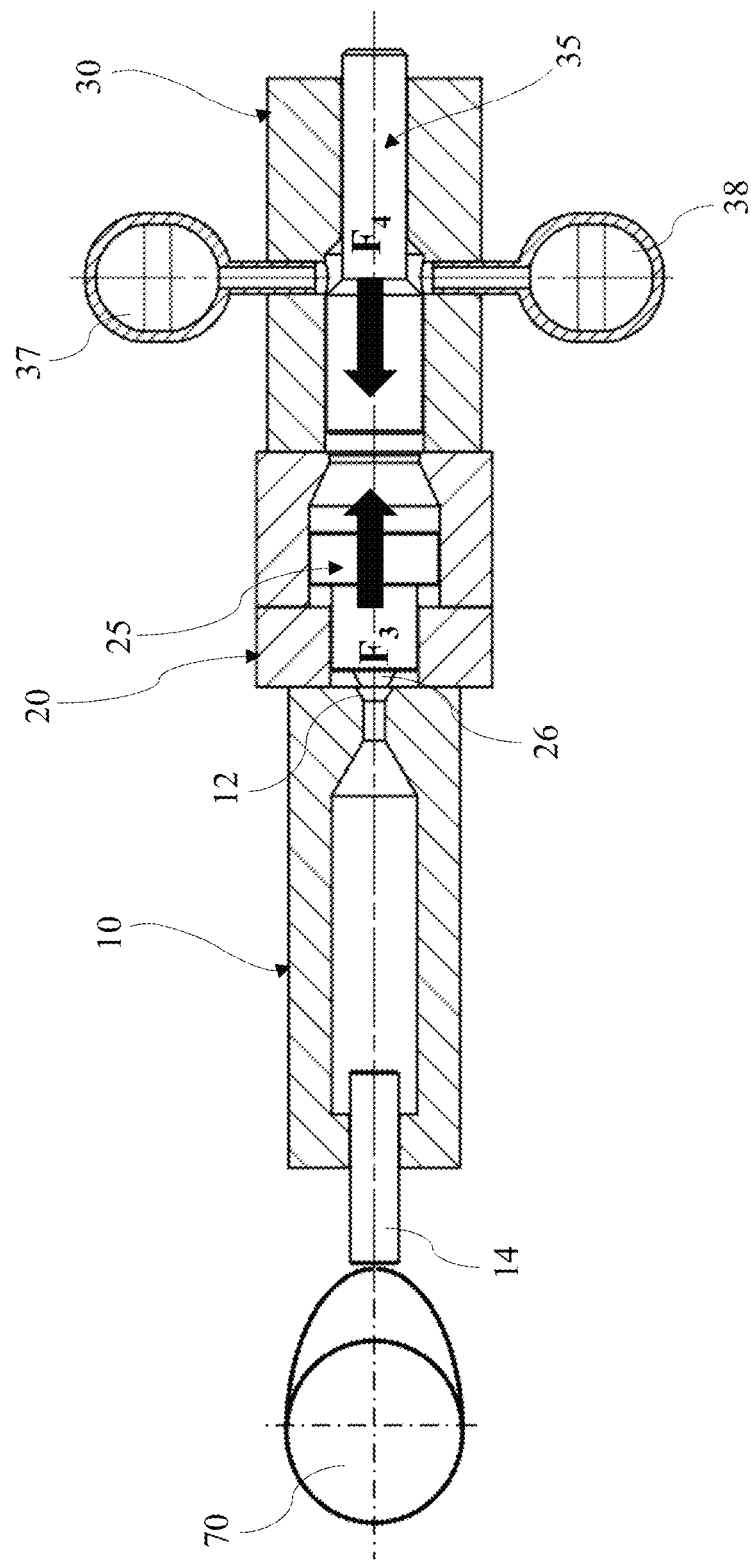

The impact bolt 35 starts to move as soon as the shock wave has a force F3 sufficiently high to overcome the force F4 acting on the annular face of the impact bolt 35 (FIG. 4).

Figure 5:
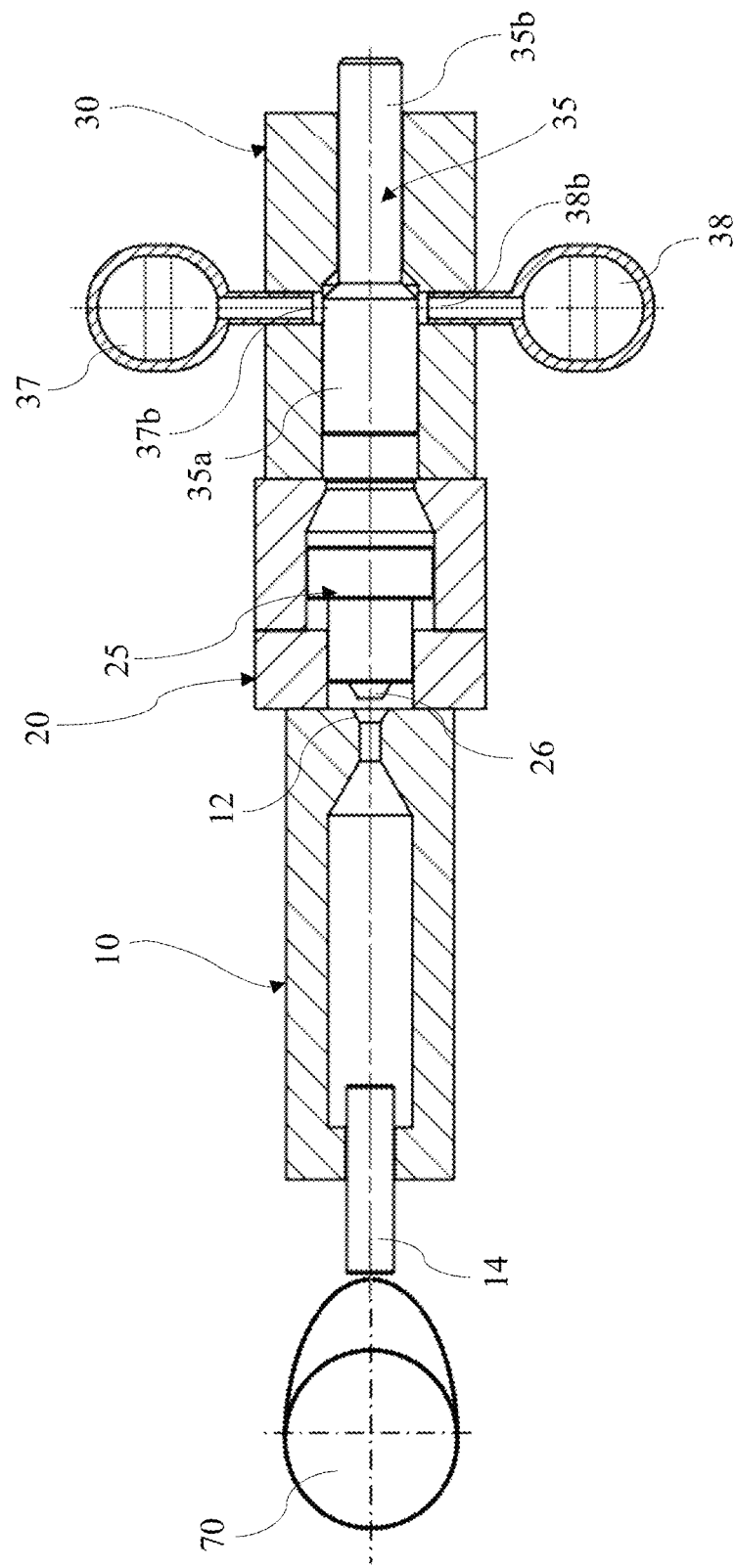

The hydraulic medium 91 from the pressure chamber 10 expands further and drives the stepped piston 25 and the impact bolt 35 to the right (in the drawing), the impact bolt 35 travels out of the bolt chamber 30. The speeds of the stepped piston 25 and the impact bolt 35 are different as a result of the structural translation (FIG. 5).

The impact of the shock wave on the impact bolt 35 and the associated outward movement of the impact bolt generates the impulse-dynamic process force required for the application in question. In practical use, the impact bolt 35 drives a tool, for example a shearing blade or an impact hammer or the like.

During its outward travel, the bolt portion 35a with the larger cross-section passes over the connection ports 37b and 38b of the pressure reservoirs 37 and 38 in the bolt chamber 30. The free throughflow cross-section of the connection ports 37b and 38b therefore becomes increasingly smaller as the impact bolt 35 travels outwards. Accordingly, during the outward travel of the impact bolt 35 a back pressure builds up in front of the connection ports of the reservoirs 37 and 38. That back pressure becomes ever greater as the bolt portion 35a of the impact bolt 35 passes over the connection ports and consequently generates a counter-force which reduces the speed of the impact bolt to zero in the end position. Accordingly, a hard impact of the impact bolt 35 on the mechanical stop 33 is avoided. The connection ports 37b and 38b and the arrangement thereof in the bolt chamber 30 therefore form an end position damping arrangement. Advantageously, the connection ports have a cross-section which departs from a circular shape and becomes smaller in a direction away from the stepped piston 25, towards the stop 33, as shown in FIG. 8. Such a special, pear-shaped or droplet-shaped cross-sectional shape of the connection ports benefits the build-up of the back pressure.

FIG. 8 shows a slightly modified bolt chamber 30', which differs from the bolt chamber 30 of FIGS. 1-7 essentially only in its external shape. Furthermore, the bolt chamber 30' has four connection ports each for one pressure reservoir (not shown herein), but only connection ports 37b, 38b and 39b are visible in the Figure. Each of the four connection ports has the afore-mentioned pear-shaped or droplet-shaped opening cross-section which tapers in a direction towards the stop 33. Furthermore, FIG. 8 shows two circumferential recesses (annular grooves) 34a and 34b in the chamber portion 31 and in the passage opening 32. They serve as collecting channels for discharging leakages into the collecting tanks 61 and 62. A radial line 34c, which opens into the recess 34a, serves for connection of a pressure sensor 82 (see FIG. 9).

The annular gap seal on the bolt portion 35b enables the impact bolt 35 in principle to pass fully over the connection ports 37b and 38b (and where applicable 39b). In order that the impact bolt 35 can be returned from an end position again, in this case specific hydraulic measures are additionally required, for example additional lines 37c and 37d to the pressure reservoirs 37, 38, as shown in FIG. 9. At least one line 37c connects the interior space 30a of the bolt chamber 30' in the region of the stop 33 to a circumferential annular line 37d, which in turn is connected to the pressure reservoirs 37 and 38 again. Furthermore, it can be seen from FIG. 9 that the bolt portions 35a and 35b are provided with groups of circumferential recesses (annular grooves) 36a, 36b and 36c which serve for lubricant distribution and centric mounting of the impact bolt 35. Reference numeral 83 denotes a further pressure sensor.

Figure 6:
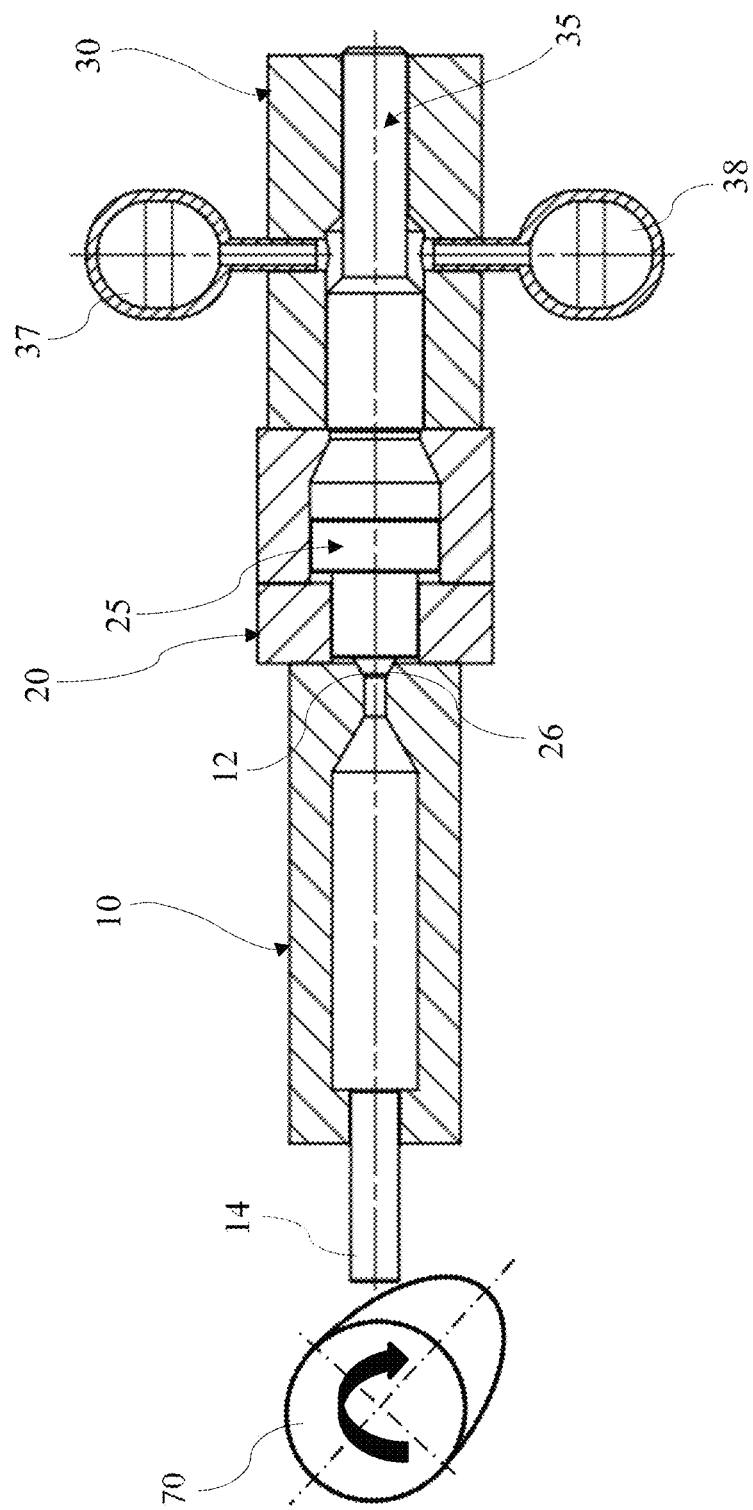

The apparatus delivers the driving force or energy required for a work process, for example a shearing process. Once the work process in question has been carried out, the apparatus is returned to its starting configuration again. For that purpose the cam plate of the plunger drive 70 is rotated further so that the plunger 14 is moved out of the pressure chamber 10 again by the pressure therein. In the case of a linear drive, the latter is returned accordingly. The impact bolt 35 is moved inwards (towards the left in the drawing) by the pressure of the pressure medium 93 from the pressure reservoirs 37 and 38. The stepped piston 25 is pushed to the left (in the drawing) by the hydraulic medium 92 in the transmission space 27, and the orifice 11 of the pressure chamber 10 is closed. Any losses of hydraulic or pressure medium volume are compensated by the hydraulic source 40 or the pressure source 50 and excess hydraulic or pressure medium volumes are eliminated by the leakages of the individual chambers (FIG. 6).

Depending upon the application for which the apparatus is to be used, the tools to be driven by the impact bolt 35 (for example shearing blades or impact hammers) can be joined to the impact bolt or not.

With the aid of an adjustable idle stroke between the impact bolt 35 and the tool, an extremely wide range of combinations of the kinetic energy of the impact bolt and the residual energy (from potential energy) of the pressure chamber 10 can be used. The residual energy of the tool must in this case be eliminated separately by suitable damping measures.

If the tool is fixedly joined to the impact bolt 35, the residual energy of both elements is eliminated internally in the inbuilt end position damping in the apparatus.

The work process driven by the impact bolt 35 preferably has to take place before the impact bolt passes over the connection ports 37b and 38b to the pressure reservoirs 37 and 38 (beginning of end position damping).

For controlling the fill pressure in the chambers 10, 20 and 30 of the apparatus, downstream of the pressure sources 40 and 50 it is possible to use servo valves or pressure proportioning valves with or without electrical actuation. The non-return valve 41 is absolutely necessary. The non-return valves 42 and 51 can also be replaced by appropriately dimensioned throttles.

Figure 7:
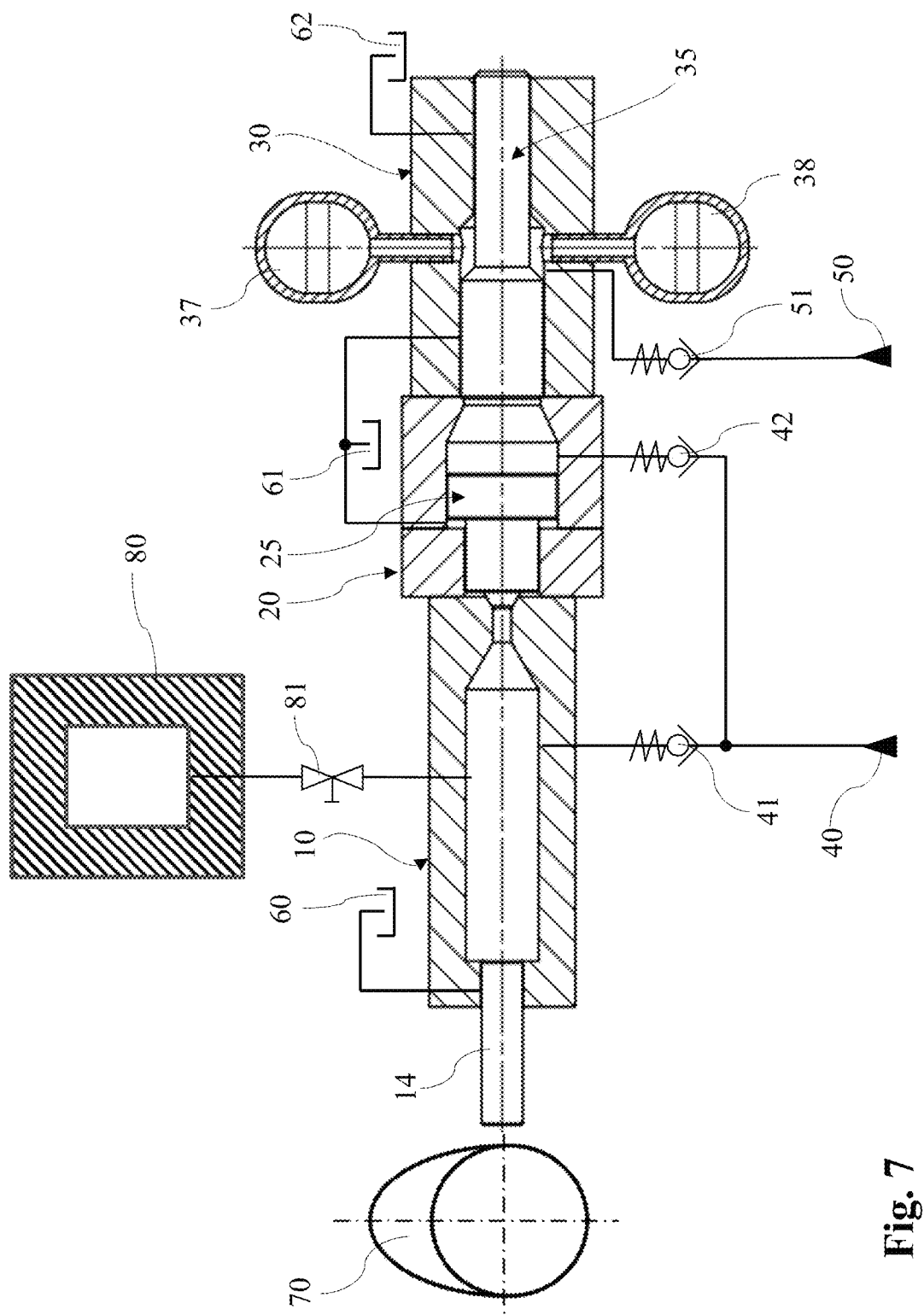
FIG. 7 shows an axial section through a second exemplary embodiment of the apparatus according to the invention.

FIG. 7 shows a variant of the apparatus according to the invention which differs from the exemplary embodiment of FIGS. 1 to 6 only by an additional high-pressure container 80 which, via a line (not referenced) and via a shut-off valve 81, for example an electrically actuatable shut-off valve, is in communicating connection with the pressure chamber 10 or is decoupled therefrom, depending upon the position of the shut-off valve. In terms of structure and functioning, this variant otherwise entirely corresponds to the apparatus according to FIG. 1, for which reason not all the reference numerals have been included in FIG. 7.

In the case of a continuously rotating plunger drive 70, the additional high-pressure container 80 serves to prevent triggering of the impact impulse if that is desirable or necessary for some reason. For that purpose the normally closed shut-off valve 81 is opened and the high-pressure container 80 is thereby connected to the pressure chamber 10. The capacity of the pressure chamber 10 is thereby increased and, if the stroke of the plunger 14 remains the same, the increase in pressure becomes smaller and, if the system is suitably arranged, the orifice 11 is not opened.

In the event of a malfunction of the stepped piston 25, for example if the fill pressure in the transmission space 27 is too low or the orifice 11 is not closed, the impact bolt 35 follows the kinematics of the plunger drive 70 or the movement of the plunger 14 in accordance with the inbuilt translations.

The exemplary embodiments of the apparatus according to the invention described above are directed especially to use in a separating process (for example shearing off a workpiece from a rod material independently of the temperature range), but can also be used, for example, in a compacting process, for example in powder metallurgy, or for breaking up a material.

Figure 10:
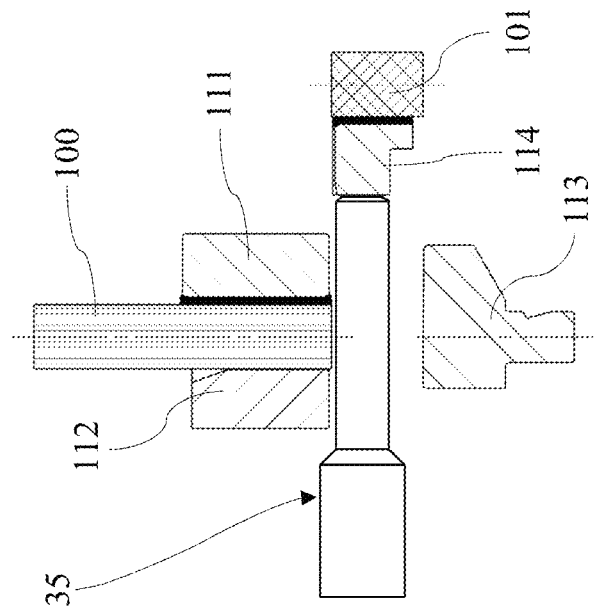
FIG. 10-11 are diagrams illustrating the use of the apparatus in a shearing process.
Figure 11:
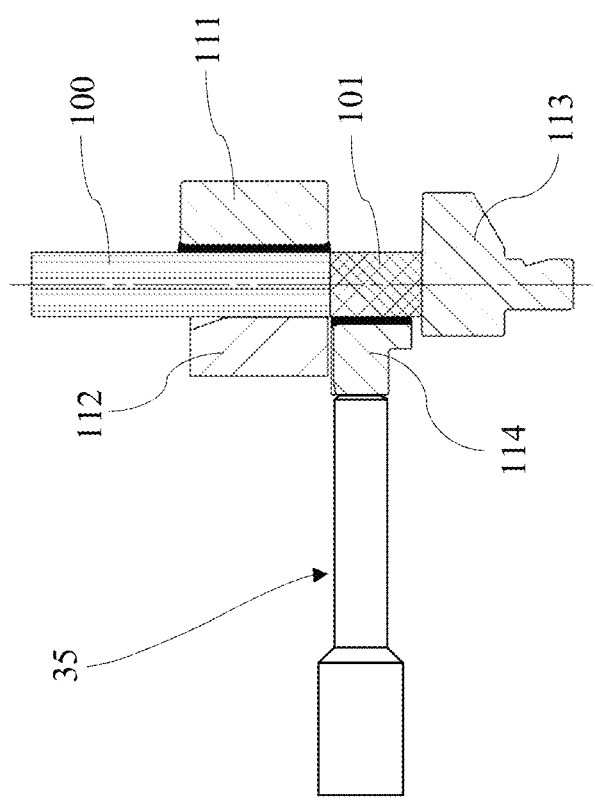

FIGS. 10 and 11 show, by way of example, in diagrammatic form a use of the apparatus according to the invention in a shearing process.

Reference numeral 100 denotes a rod from which a workpiece 101 is being sheared off. The rod 100 is held between a fixed blade 111 and a clamping jaw 112 and rests with the workpiece 101 against a stop 113 (FIG. 10). The impact bolt 35 of the apparatus according to the invention for generating impulse-dynamic process forces rests against a shearing blade 114 and, in an impact-like outward movement, drives the latter against the workpiece in an extremely short time and separates it from the remainder of the rod 100 (FIG. 11).

It will be understood that in principle it is also possible for the impact bolt 35 not to be in direct contact with the shearing blade 114 but for further parts to be arranged therebetween.

The invention claimed is:

1. An apparatus for generating impulse-dynamic process forces, comprising:
   a pressure chamber in which a pressurised hydraulic medium is arranged;
   means for temporarily increasing the pressure of the hydraulic medium located in the pressure chamber;
   a connecting chamber arranged downstream of the pressure chamber and connected thereto;
   a bolt chamber arranged downstream of the connecting chamber and connected thereto;
   a stepped piston arranged so as to be displaceable in the connecting chamber, which piston has a valve body for closing an orifice connecting the pressure chamber to the connecting chamber, and a piston portion facing the bolt chamber, by means of which piston portion a transmission space of the connecting chamber between the piston portion and the bolt chamber is sealed with respect to the side of the connecting chamber remote from the bolt chamber, the transmission space having a pressurised hydraulic medium arranged therein; and
   an impact bolt arranged so to be displaceable in the bolt chamber,
   wherein the impact bolt has a first bolt portion with a larger cross-section and a second bolt portion with a smaller cross-section, the first bolt portion sealing an interior space of the bolt chamber that surrounds the second bolt portion with respect to the connecting chamber, and there is connected to the bolt chamber at least one pressure reservoir containing a pressurised pressure medium, which the at least one pressure reservoir is in communicating connection via a connection port arranged in the bolt chamber with the interior space of the bolt chamber.

2. The apparatus according to claim 1, wherein the bolt chamber is arranged immediately downstream of the connecting chamber.

3. The apparatus according to claim 2, wherein the apparatus has two or more pressure reservoirs with associated connection ports which are arranged diametrically opposite or at equal distances apart in the bolt chamber.

4. The apparatus according to claim 2, wherein the impact bolt is arranged to travel out as far as an end position in the bolt chamber, and the apparatus has an end position damping arrangement which brakes the impact bolt before it reaches the end position.

5. The apparatus according to claim 2, wherein the opening cross-section of the at least one connection port tapers in a direction away from the stepped piston.

6. The apparatus according to claim 1, wherein the apparatus has two or more pressure reservoirs with associated connection ports which are arranged diametrically opposite or at equal distances apart in the bolt chamber.

7. The apparatus according to claim 6, wherein the impact bolt is arranged to travel out as far as an end position in the bolt chamber, and the apparatus has an end position damping arrangement which brakes the impact bolt before it reaches the end position.

8. The apparatus according to claim 1, wherein the impact bolt is arranged to travel out as far as an end position in the bolt chamber, and the apparatus has an end position damping arrangement which brakes the impact bolt before it reaches the end position.

9. The apparatus according to claim 8, wherein the at least one connection port for the pressure reservoir is arranged in the bolt chamber so that, during the outward travel of the impact bolt, the at least one connection port is increasingly closed by the first bolt portion and the resulting back pressure increasingly brakes the impact bolt until the impact bolt comes to a complete standstill.

10. The apparatus according to claim 9, wherein the end position is defined by a stop.

11. The apparatus according to claim 8, wherein the end position is defined by a stop.

12. The apparatus according to claim 1, wherein the opening cross-section of the at least one connection port tapers in a direction away from the stepped piston.

13. The apparatus according to claim 1, wherein the impact bolt is returnable to a starting position by means of the at least one pressure reservoir.

14. The apparatus according to claim 1, wherein the means for temporarily increasing the pressure of the hydraulic medium located in the pressure chamber have, for compression of the hydraulic medium located in the pressure chamber, a plunger which is arranged to be pushed into the pressure chamber or a high-pressure reservoir from which a pressure impulse is deliverable to the pressure chamber via a valve.

15. The apparatus according to claim 14, wherein the apparatus has a plunger drive for pushing the plunger into the pressure chamber.

16. The apparatus according to claim 1, wherein the apparatus has means for maintaining the fill pressure in the pressure chamber, in the transmission space and in the interior space of the bolt chamber.

17. The apparatus according to claim 1, wherein the apparatus has lines via the which hydraulic medium or the pressure medium that is displaced or escapes through sealing gaps on displacement of the stepped piston and the impact bolt can be supplied to a collecting tank.

18. The apparatus according to claim 1, wherein the connection port for the pressure reservoir is at least partially closable by the first bolt portion of the impact bolt.

19. A method for driving a tool in a forming device, a separating device or a compacting device comprising using the apparatus according to claim 1.

20. The method according to claim 19, wherein the tool is a shearing tool for shearing off a workpiece from a rod material.

21. The method according to claim 19, wherein the tool is an impact hammer for compacting or breaking up a material.

* * * * *